United States Patent
Moon et al.

(10) Patent No.: US 10,227,513 B2
(45) Date of Patent: Mar. 12, 2019

(54) ADHESIVE COMPOSITION, ADHESIVE FILM PREPARED FROM THE SAME AND DISPLAY MEMBER INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Hyung Rang Moon, Uiwang-si (KR); Ji Ho Kim, Uiwang-si (KR); Il Jin Kim, Uiwang-si (KR); Byeong Do Kwak, Uiwang-si (KR); Jee Hee Kim, Uiwang-si (KR); Sung Hyun Mun, Uiwang-si (KR); Seon Hee Shin, Uiwang-si (KR); Gwang Hwan Lee, Uiwang-si (KR); Woo Jin Lee, Uiwang-si (KR); Eun Hwa Lee, Uiwang-si (KR); Ik Hwan Cho, Uiwang-si (KR); Jae Hyun Han, Uiwang-si (KR); Chung Kun Cho, Yongin-si (KR)

(73) Assignees: SAMSUNG SDI CO., LTD., Yongin-si, Gyeonggi-do (KR); SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 136 days.

(21) Appl. No.: 14/923,520

(22) Filed: Oct. 27, 2015

(65) Prior Publication Data
US 2016/0122600 A1 May 5, 2016

(30) Foreign Application Priority Data

Nov. 1, 2014 (KR) .......... 10-2014-0153213
Nov. 12, 2014 (KR) .......... 10-2014-0157480
Oct. 19, 2015 (KR) .......... 10-2015-0145681

(51) Int. Cl.
*C09J 133/14* (2006.01)
*C09J 4/00* (2006.01)
(Continued)

(52) U.S. Cl.
CPC .......... *C09J 133/14* (2013.01); *C09J 4/00* (2013.01); *C09J 7/22* (2018.01); *C09J 7/30* (2018.01);
(Continued)

(58) Field of Classification Search
CPC .......... C09J 4/00; C09J 7/30; C08K 7/16
See application file for complete search history.

(56) References Cited

U.S. PATENT DOCUMENTS 5,162,432 A * 11/1992 Machado .......... C08G 67/02
525/185
6,291,593 B1 * 9/2001 Cheng .......... C08K 3/0008
156/327
(Continued)

FOREIGN PATENT DOCUMENTS

CN 1764679 A 4/2006
CN 102753635 A 10/2012
(Continued)

OTHER PUBLICATIONS

Brandrup The Polymer Handbook 1999.*
(Continued)

*Primary Examiner* — Mark S Kaucher
(74) *Attorney, Agent, or Firm* — Lee & Morse, P.C.

(57) ABSTRACT

An adhesive composition including a monomer mixture including a hydroxyl group-containing (meth)acrylate and a comonomer; and organic particles, the organic particles having an average particle diameter of about 10 nm to about 400 nm.

21 Claims, 2 Drawing Sheets

(51) Int. Cl.
*C09J 7/22* (2018.01)
*C09J 7/30* (2018.01)
*C08K 7/16* (2006.01)

(52) U.S. Cl.
CPC ........... *C08K 7/16* (2013.01); *C09J 2203/318* (2013.01); *C09J 2205/102* (2013.01); *C09J 2433/00* (2013.01)

(56) References Cited

U.S. PATENT DOCUMENTS

| | | | | |
|---|---|---|---|---|
| 2005/0181148 A1* | 8/2005 | Kim | ...................... | C08F 220/12 428/1.55 |
| 2007/0149715 A1* | 6/2007 | Lee | ........................ | C09J 133/14 525/329.5 |
| 2009/0179035 A1* | 7/2009 | Agarwal | ............. | B29C 47/0026 220/645 |
| 2009/0298969 A1* | 12/2009 | Attarwala | ............... | C09J 133/20 523/201 |
| 2014/0162044 A1* | 6/2014 | Lee | ..................... | C09J 133/066 428/220 |

FOREIGN PATENT DOCUMENTS

| | | |
|---|---|---|
| CN | 102933677 A | 2/2013 |
| CN | 103160217 A | 6/2013 |
| CN | 103865411 A | 6/2014 |
| KR | 10-2005-0056158 A | 6/2005 |
| KR | 10-2007-0055363 A | 5/2007 |
| KR | 10-2010-0002638 A | 1/2010 |
| TW | 201300474 A | 1/2013 |

OTHER PUBLICATIONS

Taiwanese Office Action dated May 18, 2016 in corresponding Taiwanese Patent Application No. 104135683.
Korean Office Action dated Feb. 12, 2016 in Corresponding Korean Patent Application No. 10-2015-0145681.
Chinese Office Action dated Feb. 23, 2017 in corresponding Chinese Patent Application No. 201510728934.1.
Chinese Office Action dated Nov. 17, 2017 in the corresponding Chinese Patent Application No. 201510728934.1.

* cited by examiner (a)

(b)

ADHESIVE COMPOSITION, ADHESIVE FILM PREPARED FROM THE SAME AND DISPLAY MEMBER INCLUDING THE SAME

CROSS-REFERENCE TO RELATED APPLICATION

Korean Patent Application Nos. 10-2014-0153213, filed on Nov. 1, 2014, 10-2014-0157480, filed on Nov. 12, 2014, and 10-2015-0145681, filed on Oct. 19, 2015 in the Korean Intellectual Property Office, are incorporated by reference herein in their entireties.

BACKGROUND

1. Field

Embodiments relate to an adhesive composition, an adhesive film formed from the same, and a display member including the same.

2. Description of the Related Art

A transparent adhesive film may be used as an adhesive film in interlayer bonding for stacking parts in an optical display or in attachment of a touchscreen of a mobile phone.

SUMMARY

Embodiments may be realized by providing an adhesive composition, including a monomer mixture including a hydroxyl group-containing (meth)acrylate and a comonomer; and organic particles, the organic particles having an average particle diameter of about 10 nm to about 400 nm.

The comonomer may include one or more of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, or a silane group-containing monomer, and may have a glass transition temperature of about −150° C. to about 0° C.

The organic particles may have a core-shell structure in which the core and the shell have respective glass transition temperatures satisfying Equation 1:

$$Tg(c)<Tg(s)$$ [Equation 1]

where Tg (c) is a glass transition temperature in degrees Celsius of the core and Tg (s) is a glass transition temperature in degrees Celsius of the shell.

The core may have a glass transition temperature of about −150° C. to about 10° C. and the shell may have a glass transition temperature of about 15° C. to about 150° C.

The organic particles may be present in an amount of about 0.1 parts by weight to about 15 parts by weight based on 100 parts by weight of the monomer mixture.

Embodiments may be realized by providing an adhesive film, including a hydroxyl group-containing (meth)acrylic copolymer; and organic particles, the adhesive film having a storage modulus of about 10 kPa to about 1,000 kPa at 80° C.

The hydroxyl group-containing (meth)acrylic copolymer may be polymerized from a monomer mixture including a hydroxyl group-containing (meth)acrylate and a comonomer.

The comonomer may include one or more of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, or a silane group-containing monomer, and may have a glass transition temperature of about −150° C. to about 0° C.

The hydroxyl group-containing (meth)acrylic copolymer may be polymerized from a monomer mixture including about 5 wt % to about 40 wt % of a hydroxyl group-containing (meth)acrylate and about 60 wt % to about 95 wt % of a comonomer.

The adhesive film may have a glass transition temperature of about 0° C. or less.

A difference in index of refraction between the organic particles and the hydroxyl group-containing (meth)acrylic copolymer may be about 0.1 or less.

The adhesive film may have a storage modulus of about 20 kPa to about 500 kPa at −20° C.

A ratio of storage modulus at 25° C. to storage modulus at −20° C. of the adhesive film may range from about 1:1 to about 1:4.

A ratio of storage modulus at 80° C. to storage modulus at −20° C. of the adhesive film may range from about 1:1 to about 1:10.

The adhesive film may have a T-peel strength of about 400 gf/in to about 4,000 gf/in, as measured at 25° C. with respect to a corona-treated polyethylene terephthalate film.

The adhesive film may have a T-peel strength of about 200 gf/in to about 3,000 gf/in, as measured at 60° C. with respect to a corona-treated polyethylene terephthalate film.

The adhesive film may have a thickness of about 100 μm and a haze of about 5% or less.

The adhesive film may have a thickness of about 100 μm and a haze of about 5% or less, as measured after the adhesive film is subjected to 200% stretching.

The adhesive film may have a recovery rate of about 30% to about 98%, as represented by Equation 2:

$$\text{Recovery rate (\%)}=(1-(X_f/X_0))\times 100,$$ [Equation 2]

wherein:

$X_0$ is an initial thickness of the adhesive film, and $X_f$ is measured as follows:

bonding ends of two polyethylene terephthalate films, each having a thickness of about 75 μm, a length of about 50 mm, and a width of about 20 mm, to each other via the adhesive film having a length of 20 mm and a width of 20 mm by bonding a first end of a first polyethylene terephthalate film to a first end of the adhesive film and then bonding a second end of the adhesive film to a first end of the second polyethylene terephthalate film; securing first and second jigs to non-bonded ends of the polyethylene terephthalate films; keeping fixed the first jig and pulling the second jig such that the adhesive film is pulled to a length of 10 times the initial thickness of the adhesive film at a pulling rate of about 300 mm/min and then maintained for 10 seconds; applying a force of 0 kPa to the adhesive film by recovering the adhesive film at a same rate as the pulling rate; and measuring an increased length of the adhesive film.

The adhesive film may have a bubble generation area of about 0%, and the bubble generation area may be measured by bending the adhesive film having a length of 13 cm, a width of 3 cm, and a thickness of 100 μm, and including a 50 μm thick polyethylene terephthalate film stacked on a first surface thereof and a 100 μm thick polyethylene terephthalate film stacked on a second surface thereof towards the 50 μm thick polyethylene terephthalate film such that the adhesive film has half the length, placing the adhesive film between parallel frames having a gap of about 1 cm, and aging under conditions of 70° C. and 93% relative humidity for 24 hours.

The adhesive film may not suffer from detachment or bubble generation after about 100,000 cycles or more, as measured by attaching the adhesive film having a thickness of about 100 μm between two corona-treated about 50 μm thick polyethylene terephthalate substrates, and repeatedly bending at room temperature at a rate of 30 cycles/min such that a radius of curvature of the adhesive film becomes 3 mm, 1 cycle being bending the adhesive film in half once and unfolding the adhesive film back.

Embodiments may be realized by providing a display member, including an optical film; and an adhesive layer formed on one or both surfaces of the optical film and formed of the presently disclosed adhesive composition.

Embodiments may be realized by providing a display member, including an optical film; and the presently disclosed adhesive film formed on one or both surfaces of the optical film.

The optical film may include a touch panel, a window, a polarizing plate, a color filter, a retardation film, an elliptical polarizing film, a reflective film, an anti-reflective film, a compensation film, a brightness improving film, an alignment film, an optical diffusion film, a glass shatter-proof film, a surface protective film, an organic light-emitting diode device barrier layer, a plastic liquid-crystal display substrate, indium tin oxide (ITO) containing films, fluorinated tin oxide (FTO) containing films, aluminum-doped zinc oxide (AZO) containing films, a carbon nanotube-containing film, a Ag nanowire-containing film, or graphene.

BRIEF DESCRIPTION OF DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

As used herein, the term "(meth)acrylate" may refer to an acrylate and/or a methacrylate.

As used herein, the term "copolymer" may include an oligomer, a polymer, or a resin.

As used herein, the term "comonomer" refers to a monomer polymerized with a hydroxyl group-containing (meth)acrylate, and may be any monomer that may be polymerized with a hydroxyl group-containing (meth)acrylate.

As used herein, the term "average particle diameter" refers to a z-average particle diameter of organic particles, as measured in a water-based or organic solvent using a Zetasizer nano-ZS (Malvern Co., Ltd.).

As used herein, the term "core-shell structure" may refer to a core-shell structure including structures having several layers of cores or shells, and the term "outermost layer" refers to the outermost layer among the several layers.

Figure 2:
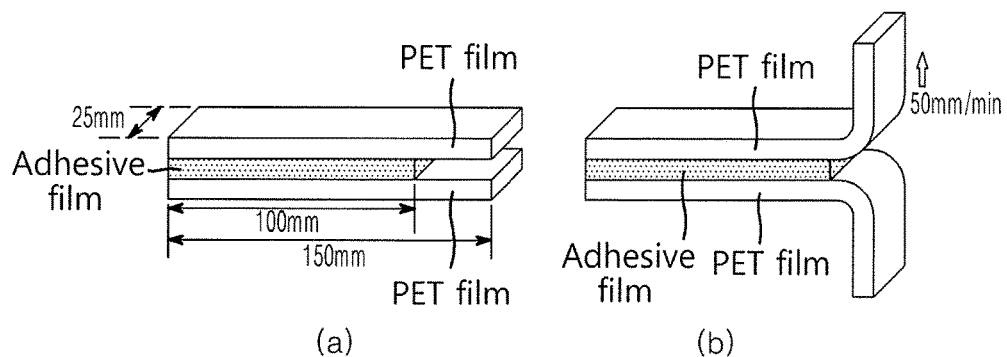
FIG. 2 illustrates a conceptual diagram of a specimen for measuring T-peel strength.

As used herein, the term "T-peel strength" refers to a value measured by the following procedures of i) to v).

i) An adhesive composition is coated onto a polyethylene terephthalate (PET) release film, followed by ultraviolet (UV) irradiation at a dose of 2000 mJ/cm$^2$, thereby manufacturing an about 100 μm thick adhesive sheet of an adhesive film and the PET film.

ii) A PET film, which has a size of about 150 mm×about 25 mm×about 75 μm (length×width×thickness) and is subjected to corona treatment twice (total dose: 156) under corona discharge at a dose of 78 using a corona treatment device, is prepared.

iii) An adhesive film sample having a size of about 100 mm×about 25 mm×about 100 μm (length×width×thickness) is obtained from the adhesive sheet, followed by laminating the corona-treated surfaces of the PET films to both surfaces of the adhesive film sample, thereby preparing a specimen, as shown in FIG. 2(a).

iv) The specimen is subjected to autoclaving under conditions of 3.5 bar and 50° C. for 1,000 seconds and secured to a TA.XT_Plus texture analyzer (Stable Micro System Co., Ltd.).

v) In the TA.XT_Plus texture analyzer, the PET film at one side is kept fixed and the PET film at the other side is pulled at a rate of 50 mm/min, thereby measuring T-peel strength (see FIG. 2(b)).

Figure 3:
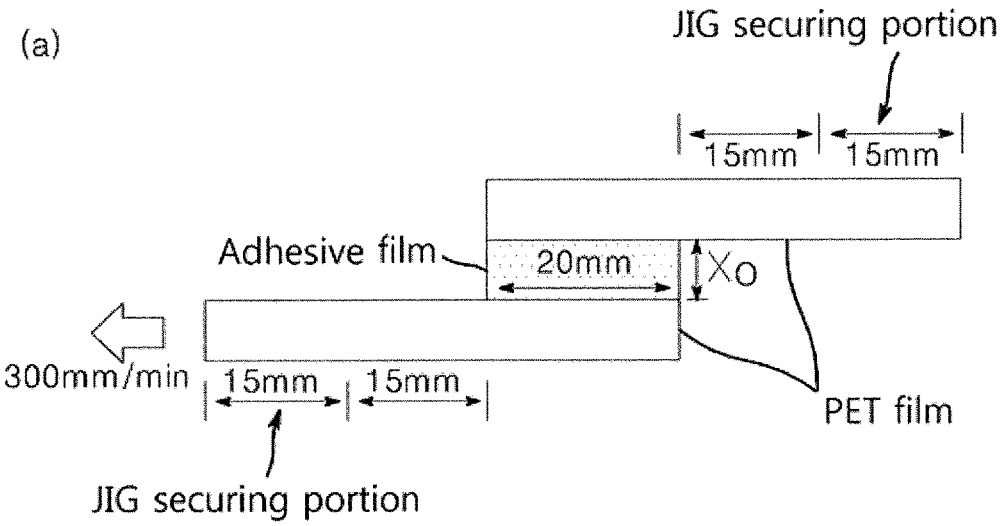
FIG. 3 illustrates sectional and plan views of a specimen for measuring recovery rate.
Figure 3:
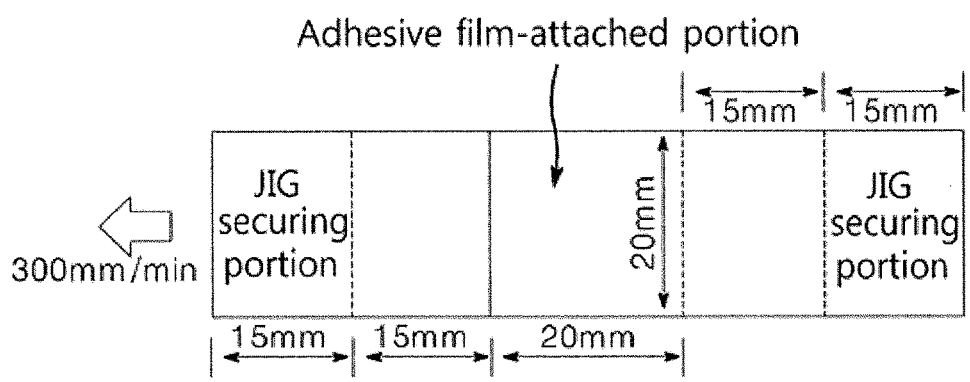

Herein, the "recovery rate" may be measured through the following procedures: When both ends of each polyethylene terephthalate (PET) film (thickness: about 75 μm) having a size of about 50 mm×about 20 mm (length×width) are defined as a first end and a second end, respectively, a specimen is prepared by bonding ends of two PET films to each other via an adhesive film having a size of about 20 mm×about 20 mm (length×width) in order of first end of first PET film/adhesive film/second end of second PET film, and has a contact area of about 20 mm×about 20 mm (length×width) between each of the PET films and the adhesive film (see FIGS. 3(a) and 3 (b)). Referring to FIG. 3(a), jigs are secured to non-bonded ends of the PET films of the specimen at room temperature (25° C.), respectively. Next, the jig at one side is kept fixed, and the jig at the other side is pulled as much as a length of 1,000% of thickness (unit: μm) of the adhesive film (10 times an initial thickness ($X_0$) of the adhesive film) at a rate of about 300 mm/min and then maintained for 10 seconds. Next, if an increased length of the adhesive film is defined as $X_f$ (unit: μm) when a force of 0 kPa is applied to the adhesive film by recovering the adhesive film at the same rate (about 300 mm/min) as the pulling rate, the recovery rate (%) is calculated by Equation 2.

$$\text{Recovery rate (\%)} = (1-(X_f/X_0)) \times 100 \qquad \text{[Equation 2]}$$

The initial thickness of the adhesive film may range from about 20 μm to about 300 μm. Recovery rate may be measured using a TA.XT_Plus texture analyzer (Stable Micro System Co., Ltd.). Recovery rate may be measured at about 25° C. to about 80° C.

As used herein, the term "bubble generation area" refers to a value (%) measured through the following procedures: An adhesive film (length×width×thickness: about 13 cm×about 3 cm×about 100 μm) including an about 50 μm thick PET film stacked on one surface thereof and an about 100 μm thick PET film stacked on the other surface thereof is bent towards the 50 μm thick PET film such that the adhesive film has half the length, and is then placed between parallel frames having a gap of about 1 cm. Next, the adhesive film is subjected to aging at 70° C. and 93% relative humidity (RH) for 24 hours, followed by analyzing an image, which is obtained through an optical microscope (EX-51, Olympus Co., Ltd.), using Mac-View software (Mountech Co., Ltd.) to measure a ratio of area occupied by bubbles to area of the adhesive film.

As used herein, the term "foldability test" refers to a test performed by the following procedures: An about 100 μm thick adhesive film is placed between two corona-treated about 50 μm thick PET substrates and attached to the two PET substrates through rollers, followed by aging at room temperature for about 12 hours. Next, the adhesive film is cut to a size of about 70 mm×about 140 mm and secured to a bending tester (CFT-200, Covotech Co., Ltd.). Next, bending a long side of the adhesive film (140 mm) is repeated at room temperature at a rate of 30 cycles/min (1 cycle is defined as bending the adhesive film in half once such that a radius of curvature becomes 3 mm, and unfolding the adhesive film back). Then, the number of cycles causing peeling or bubble generation for the first time is measured.

Adhesive Composition

Embodiments relate to an adhesive composition. The adhesive composition may include: a monomer mixture including a hydroxyl group-containing (meth)acrylate and a comonomer; and organic particles, wherein the organic particles have an average particle diameter of about 10 nm to about 400 nm.

Monomer Mixture

The monomer mixture may include the hydroxyl group-containing (meth)acrylate and the comonomer.

The hydroxyl group-containing (meth)acrylate may be a $C_1$ to $C_{20}$ alkyl group-containing (meth)acrylic acid ester having at least one hydroxyl group, a $C_5$ to $C_{20}$ cycloalkyl group-containing (meth)acrylic acid ester having at least one hydroxyl group, or a $C_6$ to $C_{20}$ aryl group-containing (meth)acrylic acid ester having at least one hydroxyl group.

For example, the hydroxyl group-containing (meth)acrylate may include one or more of 2-hydroxyethyl(meth)acrylate, 3-hydroxypropyl(meth)acrylate, 4-hydroxybutyl (meth)acrylate, 2-hydroxypropyl(meth)acrylate, 2-hydroxybutyl(meth)acrylate, or 6-hydroxyhexyl(meth)acrylate. For example, the hydroxyl group-containing (meth)acrylate may be a $C_1$ to $C_5$ alkyl group-containing (meth)acrylic monomer having a hydroxyl group, and the adhesive composition may have further improved adhesion.

The hydroxyl group-containing (meth)acrylate may be present in an amount of about 5% by weight (wt %) to about 40 wt %, for example, about 10 wt % to about 30 wt % based on the total amount of the monomer mixture. Within this range, the adhesive film may exhibit excellent adhesion and reliability.

The comonomer may include one or more of, for example, an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, or a silane group-containing monomer.

The alkyl (meth)acrylate monomer may include one or more unsubstituted $C_1$ to $C_{20}$ linear or branched alkyl (meth)acrylic esters. For example, the alkyl (meth)acrylate monomer may include one or more of methyl (meth)acrylate, ethyl (meth)acrylate, propyl (meth)acrylate, n-butyl (meth) acrylate, t-butyl (meth)acrylate, iso-butyl (meth)acrylate, pentyl (meth)acrylate, hexyl (meth)acrylate, heptyl (meth) acrylate, ethylhexyl (meth)acrylate, octyl (meth)acrylate, isooctyl (meth)acrylate, nonyl (meth)acrylate, decyl (meth) acrylate, lauryl (meth)acrylate, or isobornyl (meth)acrylate. For example, the alkyl (meth)acrylate monomer may be a $C_4$ to $C_8$ alkyl acrylic monomer, and the adhesive composition may have further improved initial adhesion.

The ethylene oxide-containing monomer may include at least one ethylene oxide group ($—CH_2CH_2O—$)-containing (meth)acrylate monomer. For example, the ethylene oxide-containing monomer may include one or more polyethylene oxide alkyl ether (meth)acrylates such as, for example, polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and polyethylene oxide mono-tert-butyl ether (meth)acrylate.

The propylene oxide-containing monomer may include one or more polypropylene oxide alkyl ether (meth)acrylates such as, for example, polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth) acrylate, polypropylene oxide diethyl ether (meth)acrylate, polypropylene oxide monoisopropyl ether (meth)acrylate, polypropylene oxide monoisobutyl ether (meth)acrylate, and polypropylene oxide mono-tert-butyl ether (meth)acrylate.

The amino group-containing monomer may include one or more amino group-containing (meth)acrylic monomers such as, for example, monomethylaminoethyl (meth)acrylate, monoethylaminoethyl (meth)acrylate, monomethylaminopropyl (meth)acrylate, monoethylaminopropyl (meth) acrylate, dimethylaminoethyl (meth)acrylate, diethylaminoethyl (meth)acrylate, N-tert-butylaminoethyl (meth)acrylate, and methacryloxyethyltrimethyl ammonium chloride (meth)acrylate.

The amide group-containing monomer may include one or more amide group-containing (meth)acrylic monomers such as, for example, (meth)acrylamide, N-methyl acrylamide, N-methyl methacrylamide, N-methylol(meth)acrylamide, N-methoxymethyl (meth)acrylamide, N,N-methylene bis(meth)acrylamide, and 2-hydroxyethyl acrylamide.

The alkoxy group-containing monomer may include one or more of, for example, 2-methoxyethyl(meth)acrylate, 2-methoxypropyl(meth)acrylate, 2-ethoxypropyl(meth) acrylate, 2-butoxypropyl(meth)acrylate, 2-methoxypentyl (meth)acrylate, 2-ethoxypentyl(meth)acrylate, 2-butoxyhexyl(meth)acrylate, 3-methoxypentyl(meth)acrylate, 3-ethoxypentyl(meth)acrylate, or 3-butoxyhexyl(meth)acrylate.

The phosphoric acid group-containing monomer may include one or more phosphoric acid group-containing acrylic monomers such as, for example, 2-methacryloyloxyethyldiphenylphosphate (meth)acrylate, trimethacryloyloxyethylphosphate (meth)acrylate, and triacryloyloxyethylphosphate (meth)acrylate.

The sulfonic acid group-containing monomer may include one or more sulfonic acid group-containing acrylic monomers such as, for example, sodium sulfopropyl (meth) acrylate, sodium 2-sulfoethyl (meth)acrylate, and sodium 2-acrylamido-2-methylpropane sulfonate.

The phenyl group-containing monomer may include one or more phenyl group-containing acrylic vinyl monomers such as, for example, p-tert-butylphenyl(meth)acrylate and o-biphenyl(meth)acrylate.

The silane group-containing monomer may include one or more silane group-containing vinyl monomers such as, for example, 2-acetoacetoxyethyl (meth)acrylate, vinyltrimethoxysilane, vinyltriethoxysilane, vinyl tris((3-methoxyethyl)silane, vinyltriacetylsilane, and methacryloyloxypropyltrimethoxysilane.

The comonomer may be present in an amount of about 60 wt % to about 95 wt %, for example, about 70 wt % to about 90 wt % based on the total amount of the monomer mixture. Within this range, the adhesive film may exhibit excellent adhesion and reliability.

In an embodiment, the comonomer may have a glass transition temperature (Tg) of about −150° C. to about 0° C. The glass transition temperature may be measured, for example, on a homopolymer of each measurement target monomer using Discovery DSC calorimeter (TA Instrument Inc.). For example, a homopolymer of each monomer may be heated to 180° C. at a rate of 20° C./min, followed by slowly cooling the homopolymer to −80° C., and then heated to 180° C. at a rate of 10° C./min, and data of an endothermic transition curve may be obtained. An inflection point of the endothermic transition curve may be determined as the glass transition temperature. The comonomer having a glass transition temperature (Tg) of about −150° C. to about 0° C. may be any comonomer that has a glass transition temperature (Tg) of about −150° C. to about 0° C. For example, the comonomer may be a comonomer having a glass transition temperature (Tg) of about −150° C. to about −20° C., or a comonomer having a glass transition temperature (Tg) of about −150° C. to about −40° C.

In an embodiment, the comonomer may include one or more of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, or a silane group-containing monomers, which may have a glass transition temperature (Tg) of about −150° C. to about 0° C.

For example, the comonomer may include one or more alkyl (meth)acrylate monomers including, for example, methyl acrylate, ethyl acrylate, isopropyl acrylate, n-butyl acrylate, iso-butyl acrylate, hexyl (meth)acrylate, heptyl (meth)acrylate, 2-ethylhexyl acrylate, and dodecyl (meth) acrylate; one or more alkylene oxide group-containing (meth)acrylate monomers including, for example, polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, and polypropylene oxide monopropyl ether (meth)acrylate; one or more amino group-containing (meth)acrylate monomers including, for example, monomethylaminoethyl (meth)acrylate, monoethylaminoethyl (meth)acrylate, monomethylaminopropyl (meth)acrylate, and monoethylaminopropyl (meth)acrylate; one or more alkoxy group-containing (meth)acrylate monomers including, for example, 2-methoxyethyl (meth)acrylate, 2-methoxypropyl(meth)acrylate, and 2-ethoxypropyl(meth) acrylate; and one or more silane group-containing (meth) acrylate monomers including, for example, 2-acetoacetoxyethyl (meth)acrylate, vinyltrimethoxysilane, and vinyltriethoxysilane.

In one embodiment, the monomer mixture may include the hydroxyl group-containing (meth)acrylate and the comonomer having a glass transition temperature (Tg) of about −150° C. to about 0° C. In this embodiment, the comonomer having a glass transition temperature (Tg) of about −150° C. to about 0° C. may be present in an amount of about 60 wt % to about 95 wt %, for example, about 70 wt % to about 90 wt % based on the total amount of the monomer mixture. Within this range, the adhesive film may exhibit excellent adhesion and reliability. The hydroxyl group-containing (meth)acrylate may be present in an amount of about 5 wt % to about 40 wt %, for example, about 10 wt % to about 30 wt % based on the total amount of the monomer mixture. Within this range, the adhesive film may have low haze and excellent adhesion.

In one embodiment, the monomer mixture may further include a carboxyl group-containing monomer.

The carboxyl group-containing monomer may include, for example, (meth)acrylic acid, 2-carboxyethyl (meth)acrylate, 3-carboxypropyl(meth)acrylate, 4-carboxybutyl (meth) acrylate, itaconic acid, crotonic acid, maleic acid, fumaric acid, and maleic anhydride.

For example, the carboxyl group-containing monomer may be present in an amount of about 10 wt % or less, about 5 wt % or less, or about 1 wt % or less based on the total amount of the monomer mixture. Within this range, the adhesive film may exhibit excellent adhesion and reliability.

The comonomer having a glass transition temperature (Tg) of about −150° C. to about 0° C. may be present in an amount of about 60 wt % to about 95 wt %, for example, about 70 wt % to about 90 wt % based on the total amount of the monomer mixture. Within this range, the adhesive film may exhibit excellent adhesion and reliability.

Organic Particles

The adhesive composition or the adhesive film may include organic particles, and the adhesive composition or the adhesive film may exhibit excellent low temperature and/or room temperature viscoelasticity and may have stable high temperature viscoelasticity due to, for example, a crosslinked structure thereof. In one embodiment, the organic particles may form a chemical bond to a hydroxyl group-containing (meth)acrylic copolymer.

The adhesive composition or the adhesive film may include the organic particles, and the adhesive composition or the adhesive film may have excellent transparency, for example, because of the average particle size described below and a difference in index of refraction between the organic particles and the hydroxyl group-containing (meth) acrylic copolymer.

The organic particles may have an average particle diameter of about 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, or 400 nm. The organic particles may have an average particle diameter ranging from one of the numerical values set forth above to another one of the numerical values set forth above. For example, the organic particles may have an average particle diameter of about 10 nm to about 400 nm, about 10 nm to about 300 nm, or about 10 nm to about 200 nm. Within this range, agglomeration of the organic particles may be prevented and the adhesive film may exhibit excellent transparency.

A difference in index of refraction between the organic particles and the hydroxyl group-containing (meth)acrylic copolymer may be about 0.1 or less, for example, from about 0 to about 0.05, or from about 0 to about 0.03. Within this range, the adhesive film may exhibit excellent transparency.

The organic particles have a core-shell structure, and the core and the shell may have a glass transition temperature satisfying Inequality 1.

$$Tg(c) < Tg(s) \qquad \text{[Inequality 1]}$$

(where Tg (c) is a glass transition temperature (° C.) of the core and Tg (s) is a glass transition temperature (° C.) of the shell).

The core may have a glass transition temperature of about −150° C. to about 10° C., for example, about −150° C. to about −5° C., or about −150° C. to about −20° C. Within this range, the adhesive film may realize storage modulus required at low temperatures (−20° C.) and may exhibit excellent low temperature and/or room temperature viscoelasticity.

The core may include one or more polyalkyl (meth) acrylates having the glass transition temperature as set forth above. For example, the core may include one or more of, for example, polymethyl acrylate, polyethyl acrylate, polypropyl acrylate, polybutyl acrylate, polyisopropyl acrylate, polyhexyl acrylate, polyhexyl methacrylate, polyethylhexyl acrylate, or polyethylhexyl methacrylate. For example, the core may include one or more of polybutyl acrylate or polyethylhexyl acrylate.

The shell may have a glass transition temperature of about 15° C. to about 150° C., for example, about 35° C. to about 150° C., or about 50° C. to about 140° C. Within this range, the organic particles may exhibit excellent dispersibility in the hydroxyl group-containing (meth)acrylic copolymer.

The shell may include one or more polyalkyl (meth) acrylates having the glass transition temperature as set forth above. For example, the shell may include one or more of, for example, polymethylmethacrylate (PMMA), polyethyl methacrylate, polypropyl methacrylate, polybutyl methacrylate, polyisopropyl methacrylate, polyisobutyl methacrylate, and polycyclohexyl methacrylate. For example, the shell may include polymethylmethacrylate.

In an embodiment, the core or the shell may include two or more layers, and an outermost layer of the organic particles may include one or more polyalkyl (meth)acrylates having a glass transition temperature of about 15° C. to about 150° C. For example, the core may include one or more polyalkyl (meth)acrylates having a glass transition temperature of about −150° C. to about 10° C., and may also include one or more polyalkyl (meth)acrylates without limitation of glass transition temperature while allowing the glass transition temperature of the overall core to satisfy about −150° C. to about 10° C. The shell may include, for example, one or more polyalkyl (meth)acrylates having a glass transition temperature of about 15° C. to about 150° C., and may also include one or more polyalkyl (meth)acrylates without limitation of a glass transition temperature while allowing the glass transition temperature of the overall shell to satisfy about 15° C. to about 150° C.

The shell may be present in an amount of about 1 wt % to about 70 wt %, for example, about 5 wt % to about 60 wt %, or about 10 wt % to about 50 wt % in the organic particles. Within this range, the adhesive film may maintain viscoelasticity in a wide temperature range and may exhibit excellent recovery rate.

The organic particles may be present in an amount of about 0.1 parts by weight, 0.3 parts by weight, 0.5 parts by weight, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, or 15 parts by weight based on 100 parts by weight of the monomer mixture. The organic particles may be present in an amount ranging from one of the numerical values set forth above to another one of the numerical values set forth above based on 100 parts by weight of the hydroxyl group-containing (meth) acrylic copolymer. For example, the organic particles may be present in an amount of about 0.1 parts by weight to about 15 parts by weight, about 0.5 parts by weight to about 10 parts by weight, or about 0.5 parts by weight to about 8 parts by weight. Within this range, the adhesive film may have balance between viscoelasticity, storage modulus, and recovery rate.

In one embodiment, the adhesive composition may include: the monomer mixture including about 5 wt % to about 40 wt %, for example, about 10 wt % to about 30 wt %, of the hydroxyl group-containing (meth)acrylate and about 60 wt % to about 95 wt %, for example, about 70 wt % to about 90 wt %, of the comonomer (for example, the comonomer having a glass transition temperature (Tg) of about −150° C. to about 0° C.); and the organic particles. Within this range, the adhesive film may exhibit excellent adhesion and reliability.

In an embodiment, the adhesive composition may include: the monomer mixture including about 5 wt % to about 40 wt %, for example, about 10 wt % to about 30 wt % of the hydroxyl group-containing (meth)acrylic monomer, about 60 wt % to about 95 wt %, for example, about 70 wt % to about 90 wt % of the comonomer (for example, the comonomer having a glass transition temperature (Tg) of about −150° C. to about 0° C.), and optionally about 10 wt % or less, for example, about 0.1 wt % to about 1 wt % of the carboxyl group-containing monomer; and the organic particles. Within this range, the adhesive film may exhibit excellent adhesion and reliability.

In one embodiment, the organic particles included in the adhesive composition may be polymerized with the monomer mixture, and a hydroxyl group-containing (meth)acrylic copolymer may be formed. In preparation of the hydroxyl group-containing (meth)acrylic copolymer, the organic particles may be used in a state of being polymerized with the monomer mixture. In this case, the organic particles may be used in a state of being included in the hydroxyl group-containing (meth)acrylic copolymer.

In an embodiment, the adhesive composition may include: the hydroxyl group-containing (meth)acrylic copolymer prepared from the monomer mixture; and the organic particles. In this case, the organic particles may be included in the adhesive composition separately from the hydroxyl group-containing (meth)acrylic copolymer.

The hydroxyl group-containing (meth)acrylic copolymer may have a glass transition temperature of about −150° C. to about −13° C., for example, about −100° C. to about −20° C. Within this range, the adhesive film may exhibit excellent adhesion in a wide temperature range and excellent reliability while exhibiting excellent foldability.

For example, the hydroxyl group-containing (meth) acrylic copolymer may be prepared by mixing the monomer mixture, the organic particles and a radical photopolymerization initiator, followed by performing solution polymerization, suspension polymerization, photopolymerization, bulk polymerization, dispersion polymerization or emulsion polymerization. In an embodiment, the hydroxyl group-containing (meth)acrylic copolymer may be prepared by preparing a prepolymer through partial polymerization of the monomer mixture, followed by introducing the organic particles into the prepolymer. For example, emulsion polymerization may be performed at about 25° C. to about 100° C. by adding a dispersant, a crosslinking agent, the monomer mixture, the organic particles, and an initiator.

The hydroxyl group-containing (meth)acrylic copolymer may be prepared by completely polymerizing the monomer mixture and the organic particles, or by partially polymerizing the monomer mixture and the organic particles, followed by completing polymerization through addition of an initiator and a crosslinking agent. Partial polymerization may be performed by polymerizing the monomer mixture and the organic particles to a viscosity of about 300 cPs to about 50,000 cPs at 25° C.

In one embodiment, the adhesive composition may further include one or more of a crosslinking agent or an initiator.

Crosslinking Agent

The crosslinking agent may be a polyfunctional (meth)acrylate. Examples of the polyfunctional (meth)acrylate may include: bifunctional acrylates such as, for example, 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol di(meth)acrylate, dimethylol dicyclopentane di(meth)acrylate, ethylene oxide-modified hexahydrophthalic acid di(meth)acrylate, neopentylglycol-modified trimethylpropane di(meth)acrylate, adamantane di(meth)acrylate, and 9,9-bis[4-(2-acryloyloxyethoxy)phenyl]fluorine; trifunctional acrylates such as, for example, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethylisocyanurate; tetrafunctional acrylates such as, for example, diglycerin tetra(meth)acrylate and pentaerythritol tetra(meth)acrylate; pentafunctional acrylates such as, for example, dipentaerythritol penta(meth)acrylate; hexafunctional acrylates such as, for example, dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate). These crosslinking agents may be used alone or in combination thereof. For example, the crosslinking agent may be a polyfunctional (meth)acrylate of a polyhydric alcohol containing 2 to 20 hydroxyl groups and may provide excellent durability.

The crosslinking agent may be present in an amount of about 0.01 parts by weight to about 10 parts by weight, for example, about 0.03 parts by weight to about 7 parts by weight, or about 0.1 parts by weight to about 5 parts by weight, based on 100 parts by weight of the monomer mixture forming the hydroxyl group-containing (meth)acrylic copolymer. Within this range, the adhesive film may exhibit excellent adhesion and improved reliability.

Initiator

The initiator may be a photopolymerization initiator or a thermal polymerization initiator.

The initiator may be an initiator which is the same as or different from the initiator used in the preparation of the hydroxyl group-containing (meth)acrylic copolymer. In an embodiment, the initiator may be a thermal polymerization initiator.

The photopolymerization initiator may be any initiator that may realize a second crosslinking structure by deriving polymerization of the radical polymerizable compound during curing through light irradiation. For example, the photopolymerization initiator may include benzoin, hydroxyl ketone, amino ketone, or phosphine oxide photoinitiators. The photopolymerization initiator may include, for example, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], and 2,4,6-trimethylbenzoyl-diphenyl-phosphine oxide. These photopolymerization initiators may be used alone or in combination thereof.

The thermal polymerization initiator may be any initiator that may realize a second crosslinking structure by deriving polymerization. For example, the thermal polymerization initiator may include initiators such as azo, peroxide, and redox compounds. Examples of the azo compound may include, for example, 2,2-azobis(2-methylbutyronitrile), 2,2-azobis(isobutyronitrile), 2,2-azobis(2,4-dimethylvaleronitrile), 2,2-azobis-2-hydroxymethylpropionitrile, dimethyl-2,2-methylazobis(2-methylpropionate), and 2,2-azobis(4-methoxy-2,4-dimethylvaleronitrile). Examples of the peroxide compound may include, for example: inorganic peroxides such as potassium perchlorate, ammonium persulfate and hydrogen peroxide; and organic peroxides such as diacyl peroxide, peroxydicarbonate, peroxyester, tetramethylbutyl peroxyneodecanoate, bis(4-butylcyclohexyl) peroxydicarbonate, di(2-ethylhexyl) peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, t-butyl peroxy neoheptanoate, amyl peroxypivalate, t-butyl peroxypivalate, t-amyl peroxy-2-ethylhexanoate, lauroyl peroxide, dilauroyl peroxide, di(dodecanoyl) peroxide, benzoyl peroxide, and dibenzoyl peroxide. Examples of the redox compound may include, for example, mixtures of a peroxide compound and a reductant. These azo, peroxide, and redox compounds may be used alone or in combination thereof.

The initiator may be present in an amount of about 0.01 parts by weight to about 5 parts by weight, for example, about 0.05 parts by weight to about 3 parts by weight, or about 0.1 parts by weight to about 1 part by weight, based on 100 parts by weight of the monomer mixture forming the hydroxyl group-containing (meth)acrylic copolymer. Within this range, curing may be completely performed, deterioration in transmittance of the adhesive composition due to, for example, the residual initiator, may be prevented, bubble generation in the adhesive composition may be reduced, and the adhesive composition may have excellent reactivity.

In an embodiment, the adhesive composition may further include a silane coupling agent.

Silane Coupling Agent

The silane coupling agent may include, for example, siloxane and epoxy silane coupling agents. The silane coupling agent may be present in an amount of about 0.01 parts by weight to about 0.1 parts by weight, for example, about 0.05 parts by weight to about 0.1 parts by weight based on 100 parts by weight of the monomer mixture forming the hydroxyl group-containing (meth)acrylic copolymer. Within this range, the adhesive film may have improved in reliability.

Additives

The adhesive composition may further include additives, such as, for example, curing accelerators, ionic liquids, lithium salts, inorganic fillers, softeners, molecular weight regulators, antioxidants, anti-aging agents, stabilizers, adhesion-imparting resins, modified resins (for example, polyol, phenol, acrylic, polyester, polyolefin, epoxy, and epoxidized polybutadiene resins), leveling agents, defoamers, plasticizers, dyes, pigments (for example, coloring pigments and extender pigments), treating agents, UV blocking agents, fluorescent whitening agents, dispersants, heat stabilizers, photostabilizers, UV absorbers, antistatic agents, coagulants, lubricants, and solvents.

The adhesive composition may further include a non-curable compound.

The adhesive composition may not include a solvent and may have a viscosity at 25° C. of about 300 cPs to about 50,000 cPs. Since the adhesive composition may not include a solvent, the adhesive composition may have improvement in reliability by reducing bubble generation. Within this range of viscosity, the adhesive composition may have excellent coatability and thickness uniformity.

Adhesive Film

An adhesive film may include a hydroxyl group-containing (meth)acrylic copolymer and organic particles, and may have a storage modulus at 80° C. of about 10 kPa to about 1,000 kPa. In one embodiment, the adhesive film may be formed of the adhesive composition as set forth above. For example, a mixture including a hydroxyl group-containing (meth)acrylate monomer, a comonomer (for example, a comonomer having a glass transition temperature (Tg) of about −150° C. to about 0° C.) and the organic particles may be polymerized, and the hydroxyl group-containing (meth)acrylic copolymer may be prepared. In an embodiment, a prepolymer may be prepared by partial polymerization of a monomer mixture, followed by introducing the organic particles into the prepolymer, and the hydroxyl group-containing (meth)acrylic copolymer may be prepared. The adhesive composition may be prepared by mixing an initiator and a crosslinking agent with the prepared hydroxyl group-containing (meth)acrylic copolymer, followed by performing UV curing of the adhesive composition, and the adhesive film may be manufacture.

For example, the adhesive composition, which may be prepared by mixing and polymerizing the monomer mixture forming the hydroxyl group-containing (meth)acrylic copolymer, the organic particles and a photopolymerization initiator, followed by adding an additional photopolymerization initiator to the polymer, may be coated onto a release film, followed by curing, and the adhesive film may be manufactured. Curing may be performed by irradiation at a wavelength of about 300 nm to about 400 nm at a dose of about 400 mJ/cm$^2$ to about 1500 mJ/cm$^2$ under oxygen-free conditions using a low-pressure lamp. A coating thickness of the adhesive composition may range from about 10 μm to about 2 mm, for example, from about 20 μm to about 1.5 mm.

The adhesive film may be used as an optically clear adhesive (OCA) film, or may be formed on an optical film, and used as an adhesive optical film. Examples of the optical film may include polarizing plates. The polarizing plates include a polarizer and a protective film formed on the polarizer, and may further include, for example, a hard coating layer or an anti-reflective layer.

In one embodiment, the adhesive film may have a storage modulus at 80° C. of about 10 kPa, 15 kPa, 20 kPa, 30 kPa, 40 kPa, 50 kPa, 60 kPa, 70 kPa, 80 kPa, 90 kPa, 100 kPa, 150 kPa, 200 kPa, 300 kPa, 400 kPa, 500 kPa, 600 kPa, 700 kPa, 800 kPa, 900 kPa, or 1,000 kPa. The adhesive film may have a storage modulus at 80° C. ranging from one of the numerical values set forth above to another one of the numerical values set forth above. For example, the adhesive film may have a storage modulus at 80° C. of about 10 kPa to about 1,000 kPa, about 10 kPa to about 800 kPa, or about 15 kPa to about 500 kPa. Within this range, the adhesive film may exhibit viscoelasticity even at high temperature as well as excellent recovery rate, and may withstand an increase in the number of cycles of a foldability test.

The adhesive film may have a storage modulus at 25° C. of about 10 kPa, 20 kPa, 30 kPa, 40 kPa, 50 kPa, 60 kPa, 70 kPa, 80 kPa, 90 kPa, 100 kPa, 150 kPa, 200 kPa, 300 kPa, 400 kPa, 500 kPa, 600 kPa, 700 kPa, 800 kPa, 900 kPa, or 1,000 kPa. The adhesive film may have a storage modulus at 25° C. ranging from one of the numerical values set forth above to another one of the numerical values set forth above. For example, the adhesive film may have a storage modulus at 25° C. of about 10 kPa to about 1,000 kPa, about 10 kPa to about 800 kPa, or about 20 kPa to about 500 kPa. Within this range, the adhesive film may exhibit viscoelasticity even at high temperature as well as excellent recovery rate, and may withstand an increase in the number of cycles of a foldability test.

The adhesive film may have a storage modulus at −20° C. of about 10 kPa, 20 kPa, 30 kPa, 40 kPa, 50 kPa, 60 kPa, 70 kPa, 80 kPa, 90 kPa, 100 kPa, 150 kPa, 200 kPa, 300 kPa, 400 kPa, 500 kPa, 600 kPa, 700 kPa, 800 kPa, 900 kPa, or 1,000 kPa. The adhesive film may have a storage modulus at −20° C. ranging from one of the numerical values set forth above to another one of the numerical values set forth above. For example, the adhesive film may have a storage modulus at −20° C. of about 10 kPa to about 1,000 kPa, about 10 kPa to about 500 kPa, or about 20 kPa to about 500 kPa. Within this range, the adhesive film may exhibit viscoelasticity at low temperature and excellent recovery rate.

The adhesive film may include the organic particles, and the adhesive film may be flexible even at low temperature (about −20° C.), may maintain a storage modulus suitable for flexible devices, may exhibit excellent viscoelasticity at low temperature (about −20° C.) and/or room temperature (about 25° C.), and may exhibit stable viscoelasticity even at high temperature (about 80° C.). The adhesive film including the organic particles may allow the organic particles to suppress coagulation between matrices as compared with the adhesive film including only the hydroxyl group-containing (meth)acrylic copolymer, and the adhesive film may exhibit excellent wettability on an adherend. Small bubbles generated due to, for example, folding, may disappear as the adherend is unfolded or an ambient temperature changes. The adhesive film may include the organic particles, and there may be a specific difference in index of refraction between the organic particles having a specific average particle size and the hydroxyl group-containing (meth) acrylic copolymer, and the adhesive film may have excellent transparency. The adhesive film may maintain viscoelasticity in a wide temperature range (−20° C. to 25° C.), and the adhesive film may exhibit excellent foldability and may be used for flexible optical members.

A ratio of storage modulus at 25° C. to storage modulus at −20° C. of the adhesive film may range from about 1:1 to about 1:4, for example from about 1:1 to about 1:3.5, or from about 1:1 to about 1:2.8. Within this range, the adhesive film may reduce stress of an adherend due to, for example, small change in properties thereof, along with temperature change, and may be used for flexible optical members since the adhesive film may not suffer from peeling or bubbles in a foldability test.

A ratio of storage modulus at 80° C. to storage modulus at −20° C. of the adhesive film may range from about 1:1 to about 1:10, for example from about 1:1 to about 1:8, or from about 1:1 to about 1:5. Within this range, the adhesive film may not suffer from deterioration in adhesion between adherends in a wide temperature range (−20° C. to 80° C.) and may be used for flexible optical members.

To improve peel strength of the adhesive film, a surface onto which the adhesive composition is coated may be subjected to surface treatment in advance, for example, corona pretreatment at about 150 mJ/cm². For example, corona pretreatment may be performed by treating a surface of an adherend (for example, a PET film) twice under corona discharge at a dose of 78 using a corona treatment device (Now plasma Co., Ltd.).

The adhesive film having a thickness of 100 μm may have a T-peel strength of about 400 gf/in, 450 gf/in, 500 gf/in, 550 gf/in, 600 gf/in, 650 gf/in, 700 gf/in, 750 gf/in, 800 gf/in, 850 gf/in, 900 gf/in, 950 gf/in, 1,000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, 3000 gf/in, 3100 gf/in, 3200 gf/in, 3300 gf/in, 3400 gf/in, 3500 gf/in, 3600 gf/in, 3700 gf/in, 3800 gf/in, 3900 gf/in, or 4000 gf/in, as measured at room temperature (about 25° C.) with respect to a corona-treated PET film. The adhesive film having a thickness of 100 μm may have a T-peel strength ranging from one of the numerical values set forth above to another one of the numerical values set forth above, as measured at room temperature (about 25° C.) with respect to a corona-treated PET film. For example, the adhesive film having a thickness of 100 μm may have a T-peel strength of about 400 gf/in to about 4,000 gf/in, about 500 gf/in to about 3,700 gf/in, or about 700 gf/in to about 3,500 gf/in, as measured at room temperature (about 25° C.) with respect to a corona-treated PET film. Within this range, the adhesive film may exhibit excellent adhesion and reliability, and may withstand an increase in the number of cycles of a foldability test.

The adhesive film having a thickness of 100 μm may have a T-peel strength of about 200 gf/in, 250 gf/in, 300 gf/in, 350 gf/in, 400 gf/in, 450 gf/in, 500 gf/in, 550 gf/in, 600 gf/in, 650 gf/in, 700 gf/in, 750 gf/in, 800 gf/in, 850 gf/in, 900 gf/in, 950 gf/in, 1,000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, or 3000 gf/in, as measured at about 60° C. with respect to a corona-treated PET film. The adhesive film having a thickness of 100 μm may have a T-peel strength ranging from one of the numerical values set forth above to another one of the numerical values set forth above, as measured at about 60° C. with respect to a corona-treated PET film. For example, the adhesive film may have a T-peel strength of about 200 gf/in to about 3,000 gf/in, about 500 gf/in to about 2,000 gf/in, or about 500 gf/in to about 1,500 gf/in, as measured at about 60° C. with respect to a corona-treated PET film. Within this range, the adhesive film may exhibit excellent adhesion and reliability even when having a curved shape at high temperatures, and may withstand an increase in the number of cycles of a foldability test.

The T-peel strength of the adhesive film is measured as follows. A specimen is prepared by laminating corona-pretreated surfaces of PET films having a size of about 150 mm×about 25 mm×about 75 μm (length×width×thickness) to both surfaces of the adhesive film having a size of about 100 mm×about 25 mm×about 100 μm (length×width×thickness). Next, the specimen is subjected to autoclaving under conditions of 3.5 bar and 50° C. for 1,000 seconds and then secured to a TA.XT_Plus texture analyzer (Stable Micro System Co., Ltd.). At 25° C. or 60° C., the PET film at one side is kept fixed and the PET film at the other side is pulled at a rate of 50 mm/min, thereby measuring T-peel strength of the adhesive film with respect to the PET film. Corona pretreatment of the PET film may be performed, for example, by treating the PET film twice (total dose: 156) under corona discharge at a dose of 78 using a corona treatment device (Now plasma Co., Ltd.).

The adhesive film having a thickness of about 100 μm may have a haze of about 5% or less, for example, about 3% or less, or about 1% or less. Within this range, the adhesive film may exhibit excellent transparency when used for optical displays.

The adhesive film having a thickness of about 100 μm may have a haze of about 5% or less, for example, about 3% or less, or about 1% or less, as measured after the adhesive film is subjected to 200% stretching. Within this range, the adhesive film may exhibit excellent transparency when used for displays.

The adhesive film having a thickness of about 100 μm may have a recovery rate of about 30% to about 98%, for example, about 40% to about 95%, or about 50% to about 83%, as represented by Equation 2. Within this range, the adhesive film may be used for optical displays and may have a long lifespan.

$$\text{Recovery rate (\%)} = (1 - (X_f/X_0)) \times 100 \qquad \text{[Equation 2]}$$

(where $X_0$ and $X_f$ are defined as follows: When both ends of a polyethylene terephthalate (PET) film are defined as a first end and a second end, respectively, a specimen is prepared by bonding ends of two PET films to each other via an adhesive film (length×width: about 20 mm×about 20 mm, thickness: about 75) in order of first end of first PET film/adhesive film/second end of second PET film. Next, jigs are secured to non-bonded ends of the PET films of the specimen at room temperature (25° C.), respectively. Next, the jig at one side is kept fixed and the jig at the other side is pulled to a length of 1,000% of thickness (unit: μm) of the adhesive film (10 times an initial thickness ($X_0$) at a rate of about 300 mm/min and then maintained for 10 seconds. When a force of 0 kPa is applied to the adhesive film by recovering the adhesive film at the same rate (about 300 mm/min) as the pulling rate, an increased length of the adhesive film is defined as $X_f$ (unit: μm)).

In one embodiment, the adhesive film (thickness: about 100 μm) may have a recovery rate of about 50% to about 95%, for example, about 55% to about 90%. Within this range, since the adhesive film may not suffer from deformation even when folded hundreds of thousands of times, the adhesive film may prevent deformation of an adherend.

In an embodiment, the adhesive film (thickness: about 100 μm) may have a recovery rate of about 45% to about 80%, for example, about 49% to about 75%. Within this range, since the adhesive film may uniformly disperse stress of adherends when folded, the adhesive film may exhibit excellent reliability.

The adhesive film may have a glass transition temperature (Tg) of about 0° C. or less, for example, about −150° C. to about 0° C., about −150° C. to about −20° C., or about −150° C. to about −30° C. Within this range, the adhesive film may exhibit excellent viscoelasticity at low temperature and room temperature.

The adhesive film may have a bubble generation area of about 0%. Within this range, the adhesive film may not suffer from detachment from an adherend.

The number of cycles for allowing the adhesive film not to suffer from detachment or bubble generation in a foldability test may be about 100,000 cycles or more, for example, about 150,000 cycles or more, or about 200,000 cycles or more. In the foldability test, detachment means that the adhesive film is peeled off an adherend, and creation of no bubbles means that the adhesive film has a bubble generation area of about 0%. Within this range, the adhesive film may be used for flexible displays, and the displays have long lifespan.

The adhesive film may be an adhesive layer attached to one or both surfaces of optical films, and may be used in attaching, for example, glass, substrates, electrodes of touch panels, liquid-crystal display (LCD)/organic light-emitting diode (OLED) modules, touch panels, and optical films to each other.

For example, the adhesive film may be used as an optically clear adhesive film or a touch panel film.

The adhesive film may have a thickness (excluding a release film) of about 1 to about 2.0 mm, for example, about 20 μm to about 1.0 mm, or about 25 μm to about 1.0 mm. Within this range, the adhesive film may be used for optical displays.

Display Member

Embodiments relate to a display member.

Figure 1:
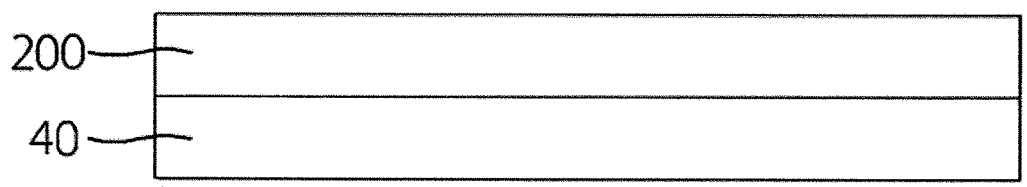
FIG. 1 illustrates a sectional view of a display member according to one embodiment.

FIG. 1 illustrates a sectional view of a display member according to one embodiment.

Referring to FIG. 1, a display member may include an optical film 40 and an adhesive layer or an adhesive film formed on one surface of the optical film 40. Reference numeral 200 in FIG. 1 may represent the adhesive layer or the adhesive film.

In one embodiment, the display member may include the optical film 40 and an adhesive layer 200 formed on one or both surfaces of the optical film 40.

The adhesive layer may be formed of the adhesive composition according to embodiments. For example, the adhesive composition, which may be prepared by mixing and polymerizing a monomer mixture forming a hydroxyl group-containing (meth)acrylic copolymer, organic particles and a photopolymerization initiator, followed by adding an additional photopolymerization initiator to the polymer, may be coated onto the optical film 40, and the adhesive layer may be formed.

In an embodiment, the display member may include the optical film 40 and the adhesive film 200 according to embodiments, which is formed on one or both surfaces of the optical film 40.

Examples of the optical film may include, for example, touch panels, windows, polarizing plates, color filters, retardation films, elliptical polarizing films, reflective films, anti-reflective films, compensation films, brightness improving films, alignment films, optical diffusion films, glass shatter-proof films, surface protective films, OLED device barrier layers, plastic LCD substrates, indium tin oxide (ITO) containing films, fluorinated tin oxide (FTO) containing films, aluminum-doped zinc oxide (AZO) containing films, carbon nanotubes (CNTs), Ag nanowires, and transparent electrode films such as, for example, graphene. The optical film may be manufactured by those of skill in the art.

For example, a touch panel may be attached to a window or an optical film via the adhesive film, and a display member may be formed. In an embodiment, the adhesive film may be applied to polarizing plates as in the art. For example, a display may include a capacitive mobile phone as an optical display.

In one embodiment, the display member may be a display member in which a first adhesive film, a touch functional unit, a second adhesive film and a window film are sequentially stacked on an optical device.

The optical device may include an OLED, an LED or a light source, and the first or second adhesive film may be the adhesive film according to embodiments. The touch functional unit may be, for example, a touch panel.

The window film may be formed of an optically transparent and flexible resin. For example, the window film may include a base layer and a hard coating layer.

The base layer may be formed of one or more of polyester resins such as polyethylene terephthalate polyethylene naphthalate, polybutylene terephthalate and polybutylene naphthalate; polycarbonate resins; polyimide resins; polystyrene resins; or poly(meth)acrylate resins such as polymethylmethacrylate.

The hard coating layer may have a pencil hardness of about 6H and may be, for example, formed of a siloxane resin.

In an embodiment, the display member may include: a liquid crystal panel in which a polarizer is stacked on both surfaces of an LCD cell; a double-sided adhesive tape (DAT) bonding functional films (for example, anti-reflective films) to each other; and a touch panel unit formed on the functional films. The touch panel unit may include: a first adhesive film; a first transparent electrode film stacked on the first adhesive film; a second adhesive film; and a second transparent electrode film. An electrode and an overcoating layer for the electrode are formed on the second transparent electrode film, and a third adhesive film and a window glass are stacked on the overcoating layer in order. An air gap may be removed upon lamination.

The following Examples and Comparative Example are provided in order to highlight characteristics of one or more embodiments, but it will be understood that the Examples and Comparative Example are not to be construed as limiting the scope of the embodiments, nor is the Comparative Example to be construed as being outside the scope of the embodiments. Further, it will be understood that the embodiments are not limited to the particular details described in the Examples and Comparative Example.

A description of details apparent to those skilled in the art will be omitted for clarity.

EXAMPLES (A) Monomer Mixture
(a1) 2-ethylhexyl acrylate (EHA) was used.
(a2) 4-hydroxybutyl acrylate (HBA) was used.
(B) Organic Particles
(b1) Organic particles, which had a core-shell structure composed of a core of polybutyl acrylate (PBA) and a shell of polymethylmethacrylate (PMMA), included 40 wt % of the shell, and had an average particle diameter of 230 nm and an index of refraction ($N_B$) of 1.48, were used.
(b2) Organic particles, which had a core-shell structure composed of a core of polybutyl acrylate (PBA) and a shell of polymethylmethacrylate (PMMA), included 30 wt % of the shell, and had an average particle diameter of 230 nm and an index of refraction ($N_B$) of 1.48, were used.
(b3) Organic particles, which had a core-shell structure composed of a core of polybutyl acrylate (PBA) and a shell of polymethylmethacrylate (PMMA), included 30 wt % of the shell, and had an average particle diameter of 130 nm and an index of refraction ($N_B$) of 1.48, were used.
(b4) Organic particles, which had a core-shell structure composed of a core of poly(2-ethylhexyl acrylate) (PEHA) and a shell of polymethylmethacrylate (PMMA), included 30 wt % of the shell, and had an average particle diameter of 140 nm and an index of refraction ($N_B$) of 1.48, were used.
(C) Initiator
(c1) Irgacure 651 (2,2-dimethoxy-2-phenylacetophenone, BASF Co., Ltd.) was used.
(c2) Irgacure 184 (1-hydroxycyclohexyl phenyl ketone, BASF Co., Ltd.) was used.
(c3) Azobisisobutyronitrile (AIBN, Junsei Co., Ltd.) was used as a thermal polymerization initiator.

Example 1

4 parts by weight of (b1) organic particles and 0.005 parts by weight of (c1) a photopolymerization initiator (Irgacure 651) were sufficiently mixed with 100 parts by weight of a monomer mixture, which included 70 wt % of (a1) 2-ethylhexyl acrylate and 30 wt % of (a2) 4-hydroxybutyl acrylate, in a glass container. Dissolved oxygen in the glass container was purged using nitrogen gas, followed by polymerizing the mixture through UV irradiation for a few minutes using a low-pressure lamp (BL lamp, Samkyo Co., Ltd.), thereby obtaining a hydroxyl group-containing (meth) acrylic copolymer having a viscosity of about 1,000 cPs and an index of refraction ($N_{AB}$) as listed in Table 1. 0.35 parts by weight of (c2) an additional photopolymerization initiator (Irgacure 184) was added to the created hydroxyl group-containing (meth)acrylic copolymer, thereby preparing an adhesive composition.

The prepared adhesive composition was coated onto a polyethylene terephthalate (PET) release film (thickness: 50 µm), thereby forming a 100 µm thick adhesive film. An upper side of the adhesive film was covered with a 75 µm thick release film, followed by irradiating both surfaces of the adhesive film with light for 6 minutes using a low-pressure lamp (BL lamp, Samkyo Co., Ltd.), thereby obtaining a transparent adhesive sheet.

Examples 2 to 7 and the Comparative Example

A transparent adhesive sheet was manufactured in the same manner as in Example 1 except that an amount of each of the components in Example 1 was modified as listed in Table 1.

Example 8

4 parts by weight of (b3) organic particles, 0.05 parts by weight of a thermal polymerization initiator (AIBN, Junsei Co., Ltd.) and 130 parts by weight of ethyl acetate were introduced into a glass container and sufficiently mixed with 100 parts by weight of a monomer mixture which included 80 wt % of (a1) 2-ethylhexyl acrylate and 20 wt % of (a2) 4-hydroxybutyl acrylate. Dissolved oxygen in the glass container was purged using nitrogen gas, followed by performing typical solution polymerization at 65° C., thereby obtaining a hydroxyl group-containing (meth)acrylic copolymer having an index of refraction ($N_{AB}$) as listed in Table 1. 0.35 parts by weight of (c2) an additional photopolymerization initiator (Irgacure 184) was added to the created hydroxyl group-containing (meth)acrylic copolymer, thereby preparing an adhesive composition.

Next, a transparent adhesive sheet was manufactured in the same manner as in Example 1, and additionally subjected to hot-air drying at 80° C. for 20 minutes and at 100° C. for 5 minutes.

The transparent adhesive sheets prepared in the Examples and the Comparative Example were evaluated as to the properties as listed in Table 1. Results are shown in Table 1.

Evaluation of Properties (1) Storage modulus: Viscoelasticity was measured at a shear rate of 1 rad/sec at a strain of 1% under auto strain conditions using ARES (MCR-501, Anton Paar Co., Ltd.) which was a dynamic viscoelasticity instrument. After removal of a release film, an adhesive film was stacked to a thickness of 500 µm. Next, the stacked body was subjected to punching using an 8 mm diameter puncher, thereby preparing a specimen. Storage modulus was measured on the specimen at a temperature of −60° C. to 90° C. at a heating rate of 5° C./min using an 8 mm jig, and storage modulus at each of −20° C., 25° C. and 80° C. was recorded.

(2) T-peel strength: A PET film having a size of 150 mm×25 mm×75 µm (length×width×thickness) was subjected to corona treatment twice (total dose: 156) under corona discharge at a dose of 78 using a corona treatment device. An adhesive film sample having a size of 100 mm×25 mm×100 µm (length×width×thickness) was obtained from each of the adhesive sheets of the Examples and the Comparative Example. Corona-treated surfaces of the PET films were laminated to both surfaces of the adhesive film sample, thereby preparing a specimen as shown in FIG. 2(a). The specimen was subjected to autoclaving at a pressure of 3.5 bar at 50° C. for 1,000 seconds and secured to a TA.XT_Plus texture analyzer (Stable Micro System Co., Ltd.). Referring to FIG. 2(b), the PET film at one side was kept fixed and the PET film at the other side was pulled at a rate of 50 mm/min at 25° C. using a TA.XT_Plus texture analyzer, thereby measuring T-peel strength at 25° C. (see FIG. 2(b)).

The PET film at one side was kept fixed and the PET film at the other side was pulled at a rate of 50 mm/min at 60° C. using a TA.XT_Plus texture analyzer, thereby measuring T-peel strength at 60° C.

(3) Haze: A haze meter (NDH 5000, Nippon Denshoku Co., Ltd.) was used. Haze was measured on a specimen having a thickness of 100 μm in accordance with American Society for Testing and Measurement (ASTM) D1003-95 (Standard Test for Haze and Luminous Transmittance of Transparent Plastic).

(4) Haze after 200% stretching: Both ends of a sample (5 cm×5 cm, thickness: 100 μm) of the manufactured adhesive film were secured to both sides of a horizontal tensile tester, followed by removing release films from both surfaces of the sample. After the sample was subjected to 200% stretching in a longitudinal direction (to a length twice an initial length thereof, that is, a length of 10 cm), a glass plate was placed on a lower side of the sample and a release film was placed on an upper side of the sample, followed by bonding the sample to the glass plate through 2 kg rollers, thereby preparing a stretched specimen. Next, the release film was removed from the upper side, followed by measuring haze in the same manner as described above.

(5) Recovery rate: Recovery rate was measured through the following procedures. When both ends of each polyethylene terephthalate (PET) film (thickness: 75 μm) having a size of 50 mm×20 mm (length×width) were defined as a first end and a second end, respectively, a specimen was prepared by bonding ends of two PET films to each other via each of the adhesive films, which were prepared in the Examples and the Comparative Example and had a size of 20 mm×20 mm (length×width), in order of first end of first PET film/adhesive film/second end of second PET film, and had a contact area of 20 mm×20 mm (length×width) between each of the PET films and the adhesive film (see FIGS. 3(a) and 3 (b)). Referring to FIG. 3(a), jigs were secured to non-bonded ends of the PET films of the specimen at room temperature (25° C.), respectively. Next, the jig at one side was kept fixed, and the jig at the other side was pulled to a length of 1,000% of thickness (unit: μm) of the adhesive film at a rate of 300 mm/min and then maintained for 10 seconds. Next, if an increased length of the adhesive film was defined as $X_f$ (unit: μm) when a force of 0 kPa was applied to the adhesive film by recovering the adhesive film at the same rate (300 mm/min) as the pulling rate, recovery rate (%) was calculated by Equation 2.

Recovery rate (%)=(1−($X_f/X_0$))×100 [Equation 2]

(6) Bubble generation area (%): An adhesive film (length×width×thickness: 13 cm×3 cm×100 μm) including a 50 μm thick PET film stacked on one surface thereof and a 100 μm thick PET film stacked on the other surface thereof was bent towards the 50 μm thick PET such that the adhesive film had half the length, and then placed between parallel frames having a gap of about 1 cm. Next, the adhesive film was subjected to aging under conditions of 70° C. and 93% RH for 24 hours, followed by analyzing an image, which was obtained through an optical microscope (EX-51, Olympus Co., Ltd.), using Mac-View software (Mountech Co., Ltd.) to measure a ratio of area occupied by bubbles to area of the adhesive film.

(7) Foldability test: A 100 μm thick adhesive film was placed between 50 μm thick corona-treated PET substrates and attached to the PET substrates through rollers, followed by aging at room temperature for 12 hours. Next, the adhesive film was cut to a size of 70 mm×140 mm and secured to a bending tester (CFT-200, Covotech Co., Ltd.) using an adhesive (4965, Tesa Co., Ltd.). Next, bending a long side of the adhesive film (140 mm) was repeated (100,000 cycles) at room temperature at a rate of 30 cycles/min such that a radius of curvature became 3 mm (1 cycle being defined as bending the adhesive film in half once and unfolding the adhesive film). After 100,000 cycles, the adhesive film suffering from peeling or bubble generations was rated as X and the adhesive film not suffering from peeling and bubbles was rated as O.

(8) Glass transition temperature (Tg, ° C.): A 15 mg (on 6 mm Al Pan) specimen was prepared from each of the adhesive films of the Examples and the Comparative Example. The specimen was heated to 180° C. at a heating rate of 20° C./min in a nitrogen atmosphere (50 mL/min), followed by cooling to −80° C. (first heating condition (1st run)). Next, while the specimen was heated to 180° C. at a heating rate of 10° C./min, a glass transition temperature (Tg) of the specimen was measured.

TABLE 1

|  |  | Example | | | | | | | | Comparative Example |
|---|---|---|---|---|---|---|---|---|---|---|
|  |  | 1 | 2 | 3 | 4 | 5 | 6 | 7 | 8 | 1 |
| (A) | (a1) | 70 | 70 | 80 | 80 | 80 | 80 | 80 | 80 | 70 |
|  | (a2) | 30 | 30 | 20 | 20 | 20 | 20 | 20 | 20 | 30 |
| (B) | (b1) (index of refraction: 1.48) | 4 | — | — | — | 4 | — | | | — |
|  | (b2) (index of refraction: 1.48) | — | 4 | — | — | — | 4 | | | — |
|  | (b3) (index of refraction: 1.48) | — | — | 4 | — | — | — | 2 | 4 | — |
|  | (b4) (index of refraction: 1.48) | — | — | — | 4 | — | — | | | — |
| Index of refraction of hydroxyl group-containing (meth)acrylic copolymer ($N_{AB}$) | | 1.47 | 1.47 | 1.48 | 1.48 | 1.48 | 1.48 | 1.48 | 1.48 | 1.47 |
| $|N_{AB}-N_B|$ | | 0.01 | 0.01 | 0 | 0 | 0 | 0 | 0 | 0 | — |
| (C) | (c1) | 0.005 | 0.005 | 0.005 | 0.005 | 0.005 | 0.005 | 0.005 | — | 0.005 |
|  | (c2) | 0.35 | 0.35 | 0.35 | 0.35 | 0.35 | 0.35 | 0.35 | 0.35 | 0.35 |
|  | (c3) | — | — | — | — | — | — | — | 0.05 | — |
| Tg of adhesive film (° C.) | | −44.6 | −45.4 | −46.2 | −47.3 | −46.8 | −46.9 | −48.1 | −46.4 | −47.6 |
| Storage modulus (kPa) | −20° C. | 130 | 110 | 73 | 61 | 80 | 71 | 74 | 65 | 86 |
|  | 25° C. | 34 | 33 | 27 | 28 | 37 | 35 | 27 | 25 | 22 |
|  | 80° C. | 18 | 23 | 15 | 18 | 33 | 29 | 14 | 18 | 6 |
| T-peel strength (gf/in) | 25° C. | 990 | 943 | 1073 | 881 | 1268 | 944 | 1105 | 984 | 483 |
|  | 60° C. | 536 | 532 | 578 | 654 | 561 | 596 | 521 | 587 | 472 |
| Haze (%) | | 0.78 | 0.49 | 0.51 | 0.44 | 0.92 | 0.49 | 0.28 | 0.52 | 0.45 |
| Haze after 200% stretching (%) | | 0.97 | 0.62 | 0.55 | 0.45 | 1.26 | 0.67 | 0.37 | 0.54 | 0.47 |
| Recovery rate (%) | | 79.5 | 78.0 | 67.2 | 49.1 | 82.5 | 74 | 50.0 | 77.5 | 38.4 |
| Bubble generation area (%) | | 0 | 0 | 0 | 0 | 0 | 0 | 0 | 0 | 2.19 |
| Foldability test (100,000 cycles) | | O | O | O | O | O | O | O | O | X |

In Table 1, amounts of (a1) and (a2) in the monomer mixture ((a1)+(a2)) are given in units of wt %, and amounts of (B) to (C) are given in units of parts by weight based on 100 parts by weight of the monomer mixture. $|N_{AB}-N_B|$ represents a difference in index of refraction between the organic particles and the hydroxyl group-containing (meth) acrylic copolymer. The index of refraction is rounded off to three decimal places.

As shown in Table 1, it could be seen that the adhesive films of Examples 1 to 8 including the organic particles had a storage modulus of about 10 MPa to about 1,000 MPa, and maintained viscoelasticity in a wide temperature range, and that the adhesive films of Examples 1 to 8 exhibited low haze (transparency), excellent foldability and peel strength as well as excellent properties in terms of, for example, recovery rate and bubble generation area (%) in high temperature and high humidity environments.

The adhesive film of the Comparative Example not including the organic particles exhibited lower high-temperature properties (peel strength, storage modulus) than the adhesive films according to embodiments and exhibited low recovery rate.

By way of summation and review, a capacitive touch pad among optical displays may be attached to a window or film via an adhesive film and may have properties thereof by sensing a change in capacitance of the window or film. An adhesive film in touch pads may be stacked between a window glass and a TSP sensor glass.

The transparent adhesive film may improve clarity of a screen as compared with existing double-sided tapes and may exhibit good adhesion while acting like glass by transmitting 97% or more of light. The transparent adhesive film may be used for, for example, tablet personal computers (PCs) and televisions (TVs) including a middle or large-sized display screen as well as for mobile phones.

Along with more severe environments of using, storing and/or manufacturing optical displays and an increasing interest in, for example, flexible optical displays, various properties may be required for the transparent adhesive film. For example, for application to flexible displays, there may be a need for a transparent adhesive film which may maintain viscoelasticity in a wide temperature range and also may exhibit excellent recoverability.

Embodiments may provide an adhesive composition, which may exhibit excellent properties in terms of reliability under severe conditions, recoverability, foldability, transparency and adhesion while maintaining viscoelasticity in a wide temperature range, an adhesive film formed of the adhesive composition, and a display member including the adhesive film.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive composition, comprising:
  a monomer mixture including 10 wt % to 40 wt % of a hydroxyl group-containing (meth)acrylate and 60 wt % to 90 wt % of a comonomer; and
  organic particles,
  the organic particles having an average particle diameter of about 10 nm to about 400 nm,
  wherein the comonomer includes an alkyl (meth)acrylate monomer having a glass transition temperature of about −150° C. to about 0° C., and
  wherein an adhesive film prepared from the adhesive composition has a ratio of storage modulus at 80° C. to storage modulus at −20° C. of the adhesive film ranges from about 1:1 to about 1:10.

2. The adhesive composition as claimed in claim 1, wherein the organic particles have a core-shell structure in which the core and the shell have respective glass transition temperatures satisfying Equation 1:

$$Tg(c)<Tg(s) \quad [\text{Equation 1}]$$

where Tg (c) is a glass transition temperature in degrees Celsius of the core and Tg (s) is a glass transition temperature in degrees Celsius of the shell.

3. The adhesive composition as claimed in claim 2, wherein the core has a glass transition temperature of about −150° C. to about 10° C. and the shell has a glass transition temperature of about 15° C. to about 150° C.

4. The adhesive composition as claimed in claim 1, wherein the organic particles are present in an amount of about 0.1 parts by weight to about 15 parts by weight based on 100 parts by weight of the monomer mixture.

5. An adhesive film prepared from the adhesive composition as claimed in claim 1, the adhesive film comprising:
  a hydroxyl group-containing (meth)acrylic copolymer that is polymerized from the monomer mixture; and
  the organic particles,
  the adhesive film having a storage modulus of about 10 kPa to about 1,000 kPa at 80° C.

6. The adhesive film as claimed in claim 5, wherein the adhesive film has a glass transition temperature of about 0° C. or less.

7. The adhesive film as claimed in claim 5, wherein a difference in index of refraction between the organic particles and the hydroxyl group-containing (meth)acrylic copolymer is about 0.1 or less.

8. The adhesive film as claimed in claim 5, wherein the adhesive film has a storage modulus of about 20 kPa to about 500 kPa at −20° C.

9. The adhesive film as claimed in claim 5, wherein a ratio of storage modulus at 25° C. to storage modulus at −20° C. of the adhesive film ranges from about 1:1 to about 1:4.

10. The adhesive film as claimed in claim 5, wherein the adhesive film has a T-peel strength of about 400 gf/in to about 4,000 gf/in, as measured at 25° C. with respect to a corona-treated polyethylene terephthalate film.

11. The adhesive film as claimed in claim 5, wherein the adhesive film has a T-peel strength of about 200 gf/in to about 3,000 gf/in, as measured at 60° C. with respect to a corona-treated polyethylene terephthalate film.

12. The adhesive film as claimed in claim 5, wherein the adhesive film has a thickness of about 100 µm and a haze of about 5% or less.

13. The adhesive film as claimed in claim 5, wherein the adhesive film has a thickness of about 100 µm and a haze of about 5% or less, as measured after the adhesive film is subjected to 200% stretching.

14. The adhesive film as claimed in claim 5, wherein the adhesive film has a recovery rate of about 30% to about 98%, as represented by Equation 2:

$$\text{Recovery rate (\%)} = (1-(X_f/X_0)) \times 100, \quad \text{[Equation 2]}$$

wherein:

$X_0$ is an initial thickness of the adhesive film, and $X_f$ is measured as follows:

bonding ends of two polyethylene terephthalate films, each having a thickness of about 75 μm, a length of about 50 mm, and a width of about 20 mm, to each other via the adhesive film having a length of 20 mm and a width of 20 mm by bonding a first end of a first polyethylene terephthalate film to a first end of the adhesive film and then bonding a second end of the adhesive film to a first end of a second polyethylene terephthalate film;

securing first and second jigs to non-bonded ends of the polyethylene terephthalate films;

keeping fixed the first jig and pulling the second jig such that the adhesive film is pulled to a length of 10 times the initial thickness of the adhesive film at a pulling rate of about 300 mm/min and then maintained for 10 seconds;

applying a force of 0 kPa to the adhesive film by recovering the adhesive film at a same rate as the pulling rate; and measuring an increased length of the adhesive film.

15. The adhesive film as claimed in claim 5, wherein the adhesive film has a bubble generation area of about 0%, and the bubble generation area is measured by:

bending the adhesive film having a length of 13 cm, a width of 3 cm, and a thickness of 100 μm, and including a 50 μm thick polyethylene terephthalate film stacked on a first surface thereof and a 100 μm thick polyethylene terephthalate film stacked on a second surface thereof towards the 50 μm thick polyethylene terephthalate film such that the adhesive film has half the length, placing the adhesive film between parallel frames having a gap of about 1 cm, and aging under conditions of 70° C. and 93% relative humidity for 24 hours.

16. The adhesive film as claimed in claim 5, wherein the adhesive film does not suffer from detachment or bubble generation after about 100,000 cycles or more, as measured by:

attaching the adhesive film having a thickness of about 100 μm between two corona-treated about 50 μm thick polyethylene terephthalate substrates, and repeatedly bending at room temperature at a rate of 30 cycles/min such that a radius of curvature of the adhesive film becomes 3 mm, 1 cycle being bending the adhesive film in half once and unfolding the adhesive film back.

17. A display member, comprising:

an optical film; and an adhesive layer formed of the adhesive composition as claimed in claim 1, wherein the adhesive layer is formed on one or both surfaces of the optical film.

18. The display member as claimed in claim 17, wherein the optical film includes a touch panel, a window, a polarizing plate, a color filter, a retardation film, an elliptical polarizing film, a reflective film, an anti-reflective film, a compensation film, a brightness improving film, an alignment film, an optical diffusion film, a glass shatter-proof film, a surface protective film, an organic light-emitting diode device barrier layer, a plastic liquid-crystal display substrate, indium tin oxide (ITO) containing films, fluorinated tin oxide (FTO) containing films, aluminum-doped zinc oxide (AZO) containing films, a carbon nanotube-containing film, a Ag nanowire-containing film, or graphene containing film.

19. A display member, comprising:

an optical film; and the adhesive film as claimed in claim 5, wherein the adhesive film is formed on one or both surfaces of the optical film.

20. The display member as claimed in claim 19, wherein the optical film includes a touch panel, a window, a polarizing plate, a color filter, a retardation film, an elliptical polarizing film, a reflective film, an anti-reflective film, a compensation film, a brightness improving film, an alignment film, an optical diffusion film, a glass shatter-proof film, a surface protective film, an organic light-emitting diode device barrier layer, a plastic liquid-crystal display substrate, indium tin oxide (ITO) containing films, fluorinated tin oxide (FTO) containing films, aluminum-doped zinc oxide (AZO) containing films, a carbon nanotube-containing film, a Ag nanowire-containing film, or graphene containing film.

21. The adhesive composition as claimed in claim 1, wherein a difference in index of refraction between the organic particles and a copolymer polymerized from the monomer mixture is about 0.1 or less.

* * * * *